Jan. 25, 1966 R. A. R. BOYER ETAL 3,231,674

ARRANGEMENT FOR THE SUPPRESSION OF NOISE IN TRANSMISSION SYSTEMS

Filed April 25, 1962 2 Sheets-Sheet 1

Inventors
ROLAND A. R. BOYER
ANDRE E. J. CHATELON
By [signature]
Attorney

Inventors
ROLAND A. R. BOYER
ANDRE E. J. CHATELON
By [signature]
Attorney

United States Patent Office 3,231,674
Patented Jan. 25, 1966

3,231,674

ARRANGEMENT FOR THE SUPPRESSION OF NOISE IN TRANSMISSION SYSTEMS

Roland Aimé Raymond Boyer, Paris, and André Edouard Joseph Chatelon, Montrouge, France, assignors to International Standard Electric Corporation, New York, N.Y., a corporation of Delaware Filed Apr. 25, 1962, Ser. No. 190,012
Claims priority, application France, May 2, 1961, 860,435, Patent 1,295,956
19 Claims. (Cl. 179—15)

Figure 1:
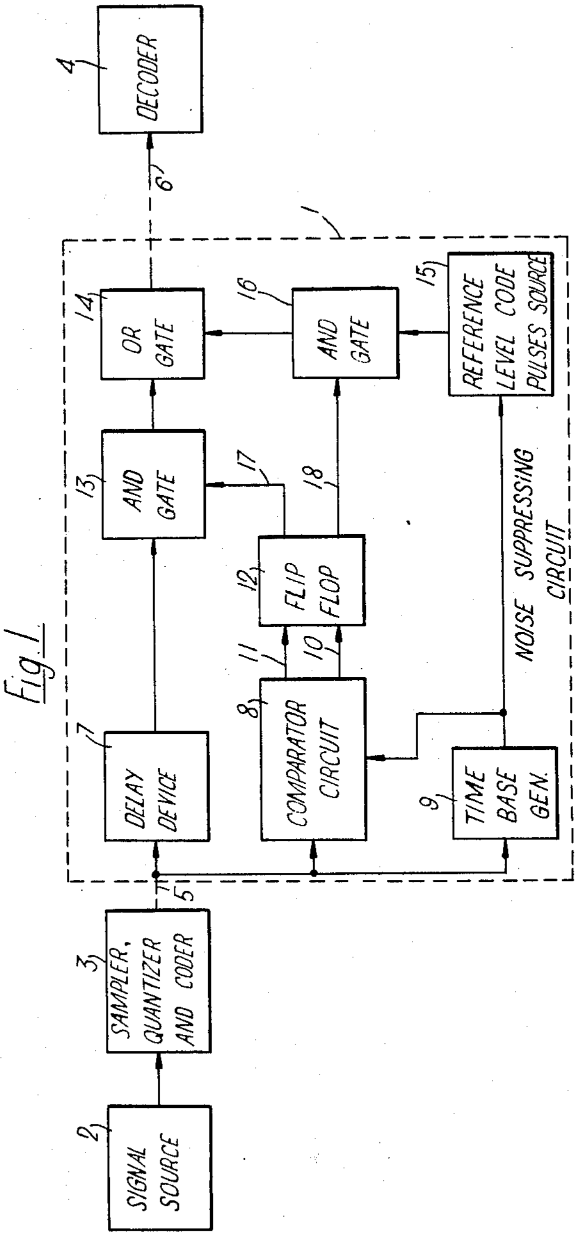

This invention relates to transmission systems and more particularly to arrangements for the suppression of noise in transmission systems of the pulse code modulation multiplex type.

In transmission systems, especially telephone systems, noise of various origins are superimposed on the useful signals and it is desirable to suppress them, or to reduce the effects produced thereby. In the case of signal transmission, such as speech signals, intelligibility may be used as one measure for estimating the effects of noise. On the other hand, the effects of noise superimposed on a signal are more important when the signal is weak and an indistinguishable noise in presence of a signal of sufficient amplitude may become unacceptable in the absence of signal, this effect being known as the mask effect. When transmission is accomplished by pulse code modulation where the signal to be coded is quantized, all noise of an amplitude lower than the difference between two adjacent quantization levels is not transmitted. In contradistinction to this advantage, the information transmitted representing the signal constitutes but approximate information on the value of the signal. The error thus produced constitutes a noise, known as quantization noise, which obviously appears only in the presence of a signal, i.e. at the moment where it is less disturbing. On the other hand, some practical considerations, such as the efficiency of the transmitter, or a limited available bandwidth, lead to the introduction of a compression of the signal amplitude at the transmitter and of a corresponding expansion at the receiver, or in other words, a reduction of dynamic range of the transmitted signal. An amplitude compressor device is constituted essentially by a device causing the amplitude of the output signal to be a decreasing function of the amplitude of the input signal, the expandor device playing a reverse role. When such compressor-expandor devices are used, the quantization noise is weaker since the signal level is smaller.

In transmission systems where the interval between the two quantized levels located on either sides of a reference level, designated the zero level and equal theoretically to the average level of the signal, is $2a$, every signal to be coded is interpreted as zero, if the average level of the signal is equal to the reference level and the absolute amplitude level has a value lower than $a$. Under these conditios, all noise having an amplitude lower than $a$ and a continuous potential equal to the reference level appearing in the absence of signal is suppressed.

When the continuous potential of the line through which the signal to be coded having an average level equal to the quantization reference lever (zero) is applied to the quantization device of the coding device, fluctuates with respect to the reference level having an absolute amplitude value higher than $a$ this fluctuating continuous potential is reproduced at the receiver. However, if the frequency of this fluctuation is sufficiently low, that is, out of the band of useful, frequencies, which is the case, for instance, of the continuous potential fluctuations on subscriber lines, the corresponding signal reproduced at the receiver is not disturbed by these low frequency fluctuations. This is not the case if a fluctuation, or noise, varying at a high frequency having an absolute amplitude value lower than $a$ is superimposed on the low frequency fluctuation. This noise (fast fluctuation) would normally be suppressed by the quantization device, or by a coder where the input signal is compared to a fixed reference level, if it appeared alone. As soon as the noise is superimposed on a low frequency, fluctuation and the sum of the absolute amplitude of the two fluctuations is higher than $a$, the noise is interpreted as a signal having a level equal to the level of the smallest signal capable of being coded. Thus, in case of absence of signal to be coded, a noise of high frequency, negligible where it is alone, gives rise, when it is superimposed on a low frequency fluctuation of the average level on the signal input line, to a substantial noise which is important to suppress. This phenomenon appears in particular multiplex transmission systems in which signals extracted from different sources (for instance, subscribers lines), the average potential of which varies from one source to the other, are supplied to a quantization device, or to a coder in which the signals from the sources are compared to a fixed reference level. This effect is more important if the quantization levels closer to the reference level are closer to each other, which is the case when the signal is compressed before quantization, or before coding.

An object of the present invention is to provide in such pulse code transmission systems a means to suppress noise which appears, in the absence of useful signal, when a high frequency noise is superimposed on low frequency fluctuations of the continuous potential of the source of signal.

A feature of the present invention is the provision of a noise suppressing means coupled in a series relationship between the coder and decoder of a pulse code modulation transmission system wherein a different group of code pulses represent each quantized level of the coder. The noise suppressing means includes a means responsive to the groups of code pulses to recognize those groups of code pulses representing a predetermined number of quantization levels and means to transmit the groups of code pulses if they do not represent any of the predetermined number of quantization levels and a group of code pulses representing the reference level if the groups of code pulses do represent any of the predetermined number of quantization levels. More specifically the predetermined number of quantization levels would be the first quantization level spaced from the reference level in both the positive and negative direction relative to the reference level.

Another feature of the present invention is the provision of an arrangement cooperating with the above-described noise suppressing means to compare each group of code pulses with the preceding group of code pulses representing a single signal and deliver a control signal when the compared groups of code pulses differ from each other by a given number of quantization levels to cause the groups of code pulses to be transmitted regardless of whether the code pulses represent the predetermined number of quantization levels. More specifically, if the adjacent groups of code pulses of a single signal correspond to quantization levels which are spaced by more than one quantization level the code pulse groups will be transmitted even if the groups of code pulses do represent the predetermined number of quantization levels.

Still another feature of this invention is the ability of incorporating the noise suppressing means of this invention at the output of the coder, at the input of the decoder, or at any location between the coder and decoder in a series relation therewith.

Figure 2:
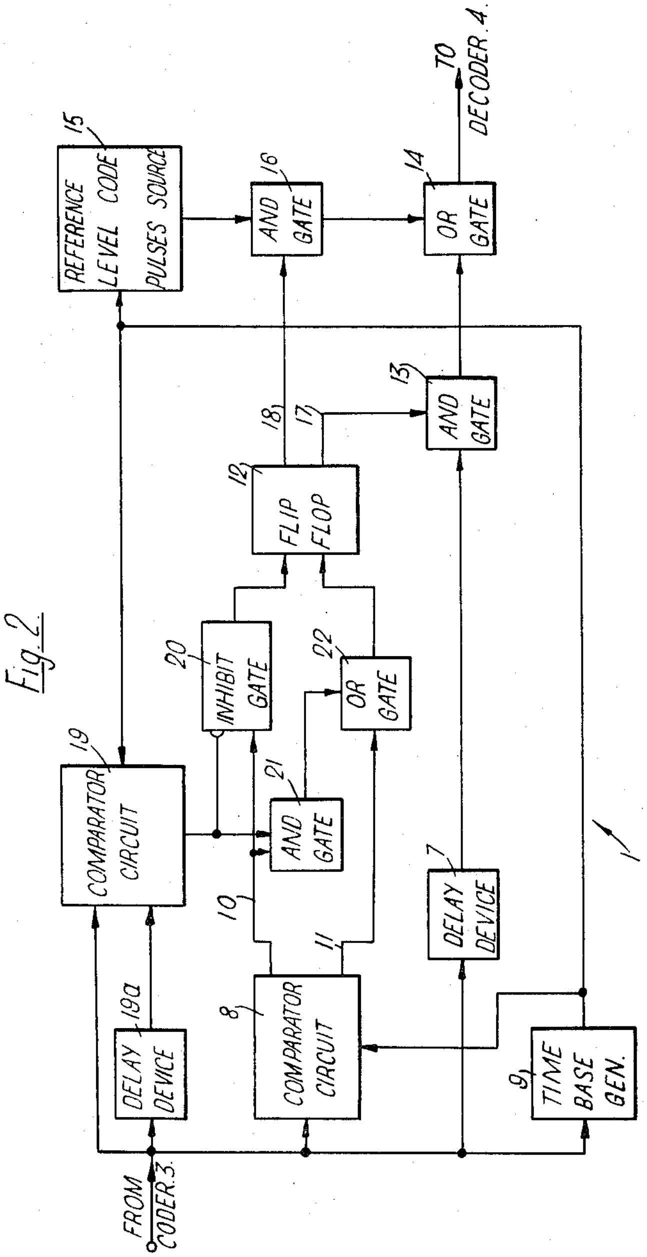

The above-mentioned and other features and objects of this invention will become more apparent by reference to the following description taken in conjunction with the accompanying drawings, in which:

FIG. 1 is a schematic diagram in block form of a pulse code transmission system incorporating one embodiment of the noise suppressing circuit following the principles of this invention; and FIG. 2 is a schematic diagram in block form of another embodiment of the noise suppressing circuit following the principles of this invention operable in the system of FIG. 1.

Referring to FIG. 1, a noise suppressing circuit 1 following the principles of this invention is illustrated as being incorporated in the pulse code modulation transmission system coupled in a series relation between signal source 2 and a code signal including sampler, quantizer and coder 3 and a decoder 4. It is to be understood that the dotted connection between the output of coder 3 and the input of circuit 1 indicated at 5 represents a transmission medium which may be a wire conductor or a radio transmission arrangement. Also the broken connection between the output of circuit 1 and the input of decoder 4 illustrated at 6 is illustrative of a transmission medium which may also be a wire conductor or the receiving end of a radio transmission medium. The circuit 1 may be connected directly through a conductor to the output of coder 3 and the ouput of circuit 1 would then be coupled to a radio transmission or wire circuit for propagation of the signal to the decoder 4. In the alternative the circuit 1 may be coupled through a radio medium or a wire circuit to the output of coder 3 with the output of circuit 1 being coupled through a conductor to the input of coder 4. In other words, circuit 1 may be disposed at any point between the output of coder 3 and the input of decoder 4 in the transmission system.

Circuit 1 is designed for cooperating with a time division multiplex transmission system employing pulse code modulation techniques. In this type of system source 2 could represent a plurality of signal sources and sampler, quantizer, and coder 3 could represent a plurality of arrangements to bring about the desired multiplexing of the plurality of signals from sources 2, or device 3 could be common to sources 2 sequentially operated by a distributor arrangement include therein to form the multiplex signal. As is well known in multiplex systems, the analog signals supplied by $m$ different sources or channels are sampled successively in a given order during each repetition period of the system. The amplitude modulated pulses resulting from the sampling operation are applied to the input of a quantizer coder to supply in a binary numeration system an indication of the input pulse amplitude after quantization in the form of a binary number comprising a given number of digits $n$. In the remainder of the description, it will be assumed that the binary system employed is the natural binary system. It is to be understood, however, that this example of the type of binary numeration employed is not meant to reduce the scope of the invention since other binary numeration systems could be used with suitable modification of the circuitry involved. In most of the known coding arrangements each binary digit of the number expressing the amplitude of a sample pulse is characterized in the coder circuit by the presence (1) or the absence (0) of a pulse on a predetermined terminal. From the point of view of the transmission, if the system operates in series the binary digits of a number representing a given sample are successively transmitted, beginning for instance with the most significant digit, each digit being disposed in a predetermined "moment" counted from a reference instant, "1" indicating a pulse inside the corresponding "moment" and "0" representing the absence of a pulse. The $p$ "moments" used for the transmission of $n$ digits corresponding to a sample are usually followed or preceded by a guard "moment" during which, in the example under consideration, a pulse identical to that representing a single "1" will be transmitted. Both the binary digits corresponding to a sample and the guard pulse constitute a message of a given channel during the repetition period under consideration. During a given repetition period following the $m$ messages corresponding to the $m$ channels a synchronizing message is transmitted having the same duration as a channel message ($n+1$ moments) and which indicates a given binary number of $(n+1)$ digits. The receiving circuits prior to application of the signals to decoder 4 are so designed as to recognize the synchronization message and derive therefrom signals capable of separating the channel messages of successive repetition periods and passing these separated messages to the appropriate output channel. Each repetition period thus comprises $(m+1)$ messages including $(n+1)$ instants having a duration $t$ seconds so that the system basic repetition frequency is $$\frac{1}{(m+1)(n+1)t}$$

In the case of a system operating in parallel the $n$ binary digits of a message are transmitted simultaneously, for instance on $n$ separate conductors and each repetition period includes $m$ messages corresponding to $m$ channels followed by a synchronizing message. In the continuation of the description only the circuits cooperating with series operating transmission systems will be described, the modification of which for operation in the parallel arrangement being obvious to those skilled in the art.

The transmission system considered operates on signals having an amplitude which varies between $-V$ and $+V$ with respect to the average level designated the zero level. In the quantization device which may be an integral part of the coder, the interval $-V$ to $+V$ has a total amplitude of $2V$ and is divided into $2_n$ quantization levels which are spaced by an amount equal to $$\frac{2V}{2_n}$$

when no compression is introduced. These quantization levels will be designated in the remainder of the description by their order number 1, 2 . . . ; $2^n$ starting from the lower limit which is equal to $-V$. Under these conditions, the average level of the signal, or the zero level, is at the limit between the quantization levels $2^{(n-1)}-1$ and $2^{(n-1)}$.

It is understood that one may also divide the interval $-V$ to $+V$ having a total amplitude of $2V$ into $2^{-n}-1$ quantization levels which when no compression is introduced are spaced by an amount equal to $$\frac{2V}{2^n-1}$$

in which case when they are designed as above by their order number $(1,2, \ldots 2^n-1)$ the average level of the signal is located in an identical way. The object of the quantization device is to make a given sample correspond to a quantization level, identified for instance, by its order number, expressed by the coder in any code whatsoever. The operations of quantization, coding, and, as the case may be, amplitude compression are often carried out by means of a single circuit in which it is sometimes difficult to separate the functions. This is not of great importance for understanding the invention. It will be assumed, by way of example, that the coder expresses in the binary numeration system the code number of the quantization level corresponding to a sample, the binary number thus obtained being transmited in the form of a message, as it has been indicated hereinabove.

Noise suppressing circuit 1 is connected in series in the transmission circuit at any location whatsoever between the output of coder 5 and the input of decoder 4, For instance, circuit 1 may be disposed at the immediate output of coder 5 which supplies in each repetition period of the system $m$ messages corresponding to the signals which are present on the $m$ channels followed by a synchronization message. These messages are applied simultaneously to the input of delay device 7, to comparator circuit 8, and to time base generator 9. Delay device 7 introduces a time delay equal to a message, viz., $(n+1)$ moments.

Time base generator 9 is designed to extract from the signals received, for instance, by filtering circuits, a sinusoidal signal having a frequency equal to the basic repetition frequency of the system, viz., $$\frac{1}{(m+1)(n+1)t}$$

This sinusoidal signal is transformed, for instance, by shaping circuits into recurrent pulses having a repetition frequency equal to $$\frac{1}{(m+1)(n+1)t}$$

and time positions which coincide with the average position of the code pulses, i.e., with the quiescent position of the code pulses experiencing rapid position fluctuation due to noise on the transmission line. Time base generator 9 is also designed in a classical way to recognize the synchronization message and to produce a pulse coinciding with a given moment of each one of the messages, for instance, the $n$th.

Comparator circuit 8 is so designed as to supply a signal on its "1" output, output 10, each time the message applied to it corresponds to one or several predetermined messages, for instance, messages corresponding to the quantization levels $2^{n-1}-1$ and $2^{n-1}+1$ located on either side of the average or reference level. Circuit 8 supplies a signal on its "0" output, output 11, when the received message does not correspond to the predetermined messages. As it will be explained further on, the signal on output 11 or output 10 appears when the message, the different elements of which are transmitted in series, has been completely received by comparator circuit 8, i.e., at the end of the $n$th moment, under control of the output of generator 9 corresponding to the $n$th moment of each message. Such comparator circuits are well known in the art. Comparator circuit 8 could be constituted by a shift register with $(n+1)$ positions having its input connected to the input of circuit 1, a binary storage arrangement to store the predetermined messages and a comparison logic circuit. When $n$ elements of a message are recorded in the last $n$ stages of the shift register, the control signal supplied from generator 9 controls the comparison of the recorded message with the stored predetermined messages in the logic circuitry. If the recorded message is identical to one of the predetermined messages, a signal appears on output 10 and if the recorded messages does not correspond to one of the predetermined messages, a signal appears on output 11.

The "0" and "1" outputs, outputs 11 and 10, respectively of comparator circuit 8 are respectively connected to the inputs of the "0" and "1" stages of a bistable circuit, such as flip-flop 12. When flip-flop 12 is in the "0" state, i.e., when a signal has appeared on output 11 of comparator 8, flip-flop 12 enables the passage of the message signals delayed in device 7 through AND gate 13 to OR gate 14 and, hence, to the output of circuit 1. When flip-flop 12 is in the "1" state, it enables the passage of the output signals from reference level code pulses source 15 through AND gate 16 to OR gate 14 and, hence, to the output of circuit 1. Source 15 is designed in such a way as to produce, in synchronism with the message applied to the input of circuit 1, the message or code pulses corresponding to the reference quantization level $2^{n-1}$, i.e., at the zero level of the analog signal. Such a circuit may be constituted in a classical way by a shift register comprising $(n+1)$ stage in which is recorded the reference level message and which is controlled and synchronized by generator 9. The reading of the information appearing successively in a given stage supplies in a series form the message sought.

Let us consider a message of duration $(n+1)$ moments, viz., $(n+1)t$, the first signal of which (i.e., the signal appearing during the first instant) is applied to the input of circuit 1 at time $t_0$. This signal appears at the output of delay device 7 starting from the instant $t_0+(n+1)t$. During the time interval $(n+1)t$, starting from $t_0$, the message has been compared in the circuit 8 to a certain number of predetermined messages and the result of this comparison is available at the output of flip-flop 12 at the end of the $(n+1)$th the moment starting from $t_0$. If the message is identical to one of the predetermined messages to which it is compared in circuit 8, flip-flop 12 supplies no output on conductor 17 and a pulse output on conductor 18 from the instant $t_0+(n+1)t$.

Under this condition AND gate 16 is open, that is, in a condition to pass information applied to its other input terminal, and AND gate 13 is blocked. The message appearing at the output of device 7 is blocked and it is replaced by the message at the output of source 15, which as it has been indicated corresponds to the quantization level $2^{n-1}$. This message is applied to the output of circuit 1 through OR gate 14. If the message appearing at the output of device 7 is not identical to anyone of the messages to which it is compared in circuit 8, flip-flop 12 supplies a pulse output on conductor 17 and no pulse output on conductor 18 from the instant $t_0+(n+1)t$. Under this condition AND gate 16 is blocked and AND gate 13 is open or unblocked. The message appearing at the output of device 7 is coupled to the output of circuit 1 through AND gate 13 and OR gate 14.

Circuit 1 has the effect of transmitting directly the messages which are applied to it (with a delay of $(n+1)t$) except when these messages are identical to a certain number of predetermined messages in which case the messages are replaced by the message corresponding to the theoretical average level. In the case under consideration, the code corresponding to the average level replaces those messages corresponding to the quantization levels on either side of the average level and immediately adjacent thereto. Circuit 1 provides a reduction of the effects of the background noise superimposed on a slow variation of the average level with an associated increase in quantization noise. It has been indicated, however, the quantization noise is much less disturbing than the background noise and quantization noise can be reduced by employing compression and expansion techniques which are usually incorporated in code modulation transmission systems. The choice of the number $q$ of quantization levels for which the average level code pulses are substituted depends obviously upon the amplitude of the background noise and upon the slow variations of the average level of the analog signal to be transmitted. Practically, with $q=2$ and $n=7$ one obtains a substantial decrease of the background noise effects when the analog signal to be coded is due to a subscriber telephone line.

The noise supressing circuit 1 of this invention can be considered to broadly include a means (comparator circuit 8) responsive to the groups of code pulse messages to recognize the groups of code pulses representing a predetermined number of quantization levels relative to the reference level and a means (flip-flop 12, gates 13, 14, and 16 and source 15) coupled to the means responsive to transmit the groups of code pulses if they do not represent the predetermined number of quantization levels and a group of code pulses representing the reference level if the groups of code pulses do represent the predetermined number of quantization levels.

Referring to FIG. 2, a schematic diagram in block form of another embodiment of noise suppressing circuit 1 operative in the system of FIG. 1 is illustrated. In the embodiment of FIG. 2 the noise suppressing circuit operates to substitute the message or group of code pulses corresponding to the average level for a message only if the message is identical to one of the predetermined messages corresponding to quantization levels close to the zero or reference level and further if the said message and the following message of the same channel correspond to adjacent quantization levels. If both of these two conditions are not present the message is transmitted without modification.

Components in FIG. 2 which have the same function as the components in FIG. 1 are indicated by identical reference characters. Signals coupled to the input of circuit 1 as in the embodiment of FIG. 1 are coupled to comparator circuit 8, delay device 7 and time base generator 9 in which circuits the input signal is operated upon as described hereinabove in connection with FIG. 1. Likewise, the input signal to circuit 1 is coupled directly to comparator circuit 19 and also through delay device 19*a* to comparator circuit 19. Delay device 19*a* has a time delay sufficient to delay the input signals to circuit 1 by one repetition period, that is, $(m+1)(n+1)t$. Comparator circuit 19 is designed to supply at the end of the $n$th moment of each message an output signal each time the two signals applied to its inputs, which will be two successive messages derived from the same analog signal due to device 19*a*, correspond to two quantization levels which are not adjacent. This could be accomplished by employing a pair of shift registers, one connected to one input and the other to the other input of circuit 19 and a logic circuit arranged in accordance with the pattern of the code employed to produce an output when the adjacent messages are compared and found to be spaced by more than one quantization level and no output when the messages represent adjacent quantization levels, the operation of circuit 19 being under control of generator 9.

Let us now consider the conditions of the signals applied to the input of circuit 1 which will permit the passage of the message received and which will cause the modification of the received message by substitution of the message or group of code pulses corresponding to the reference level.

*Condition 1.*—Comparator 8 produces an output on output 10 when the message received corresponds to the predetermined levels. Comparator circuit 19 produces an output when the two adjacent samples of a channel correspond to two quantization levels which are not adjacent. Under this condition, INHIBIT gate 20 is inhibited or blocked by the output of circuit 19 blocking the passage of the signal on output 10 through INHIBIT gate 20. AND gate 21 responds to the output from circuit 19 and the signal on output 10 to produce an output which is passed through OR gate 22 to flip-flop 12. Flip-flop 12 provides an output on conductor 17 which opens AND gate 13 and permits the passage of the received message through OR gate 14 to the output of circuit 1 without modification.

*Condition 2.*—Comparator 8 produces an output on output 11 which indicates that the message does not correspond to a predetermined quantization level and comparator 19 again produces an output indicative of the adjacent messages of the same channel representing quantization levels that are not adjacent. Under this condition, INHIBIT gate 20 is again blocked by the output of circuit 19 and AND gate 21 is likewise blocked due to the lack of output on output 10. Thus, the output from circuit 8 on output 11 passes through OR gate 22 to flip-flop 12 which produces an output on conductor 17 to open AND gate 13 to permit the received message to pass without modification through OR gate 14 to the output of circuit 1.

*Condition 3.*—Comparator 8 produces an output on output 11 indicating that the received message is not one of the predetermined messages and comparator 19 produces no output indicating that the adjacent messages of the same channel do represent adjacent quantization levels. Under this condition, INHIBIT gate 20 is open but nothing passes due to the lack of output on output 10 and, likewise, AND gate 21 does not function to pass an output since there is no output on output 10 or at the output of circuit 19. Thus, the output on output 11 is passed through OR gate 22 to flip-flop 12 which it operates to produce an output on conductor 17 permitting the passage of the received signal through AND gate 13 unmodified to OR gate 14 and, hence, to the output of circuit 1.

*Condition 4.*—In this condition the requirements of the circuit are met to modify the received message by substituting the message of the reference level therefor. Comparator 8 produces an output on output 10 indicating that the message compared corresponds to one of the predetermined levels. Comparator 19 recognizes that the adjacent messages correspond to adjacent quantization levels and, hence, produces no output. The lack of output from circuit 19 keeps AND gate 21 blocked but opens INHIBIT gate 20 and permits the output on output 10 to pass to flip-flop 12. Flip-flop 12 produces an output on conductor 18 which opens AND gate 16 to permit the passage of the code pulses representing the reference level from source 15 to OR gate 14 and, hence, to the output of circuit 1. Since there is no output on conductor 17, AND gate 13 is blocked and the message at the output of device 7 cannot pass to OR gate 14. Thus, the code pulses representing the reference level have been substituted for the message which represents a quantization level equal to one of the predetermined levels and also which is adjacent to the next succeeding message of the same channel or analog signal.

Thus, the circuit of FIG. 2 operates to modify only those messages that correspond to quantization levels close to the average level and, hence, which corresponds to a sample close to the reference level. In this way, the modification of the messages corresponding to a quantization level close to the average level and representing effectively the sample of the useful signal is avoided, thus decreasing the quantization noise introduced by the noise suppressing circuit of this invention.

Broadly, the noise suppressing circuit of FIG. 2 includes a means (circuit 19 and device 19*a*) responsive to the groups of code pulses (messages) to compare each message with the preceding message and deliver a first control signal (absence of output) when the compared groups of code pulses differ from each other by a given number of quantization levels, means (comparator circuit 8) responsive to the messages to recognize the messages representing a predetermined number of quantization levels spaced with respect to the reference level and deliver a second control signal (an output) in response to the recognition thereof and means (flip-flop 12, gates 13, 14, 16, 20, 21, 22, and source 15) responsive to the first and second control signals to transmit without alteration the messages in absence of coincidence of the first and second control signals and to substitute for the messages the group of the messages representing the reference level in response to coincidence of the first and second control signals.

It is to be understood that comparator 19 may be designed for supplying an output signal each time the two messages applied to it correspond to quantization levels separated by more than $s$ levels ($s=2$ for example instead of 1 as considered in the foregoing description). In the case where $s=1$, it is to be understood that the components forming circuit 19 may be simplified when the messages are expressed in reflected binary code numeration rather than in standard binary code.

While we have described above the principles of our invention in connection with specific apparatus, it is to be clearly understood that this description is made only by way of example and not as a limitation to the scope of our invention as set forth in the objects thereof and in the accompanying claims.

We claim:

1. A transmission system comprising:

a source of signal including varying voltage having an average value varying about a reference level and a noise voltage superimposed on said varying voltage;

a coder coupled to said source to sample said signal at given intervals, to quantize the amplitude of said signals, and to deliver a group of code pulses representing each quantized sample;

a decoder responsive to groups of code pulses to reproduce said varying voltage; and noise suppressing means coupled in a series relationship between said coder and said decoder including:

means responsive to said groups of code pulses to recognize the groups of code pulses representing a predetermined number of quantization levels spaced from said reference level; and means coupled to said means responsive to transmit said groups of code pulses if they do not represent said predetermined number of quantization levels and a group of code pulses representing said reference level if said groups of code pulses do represent said predetermined number of quantization levels.

2. A system according to claim 1, wherein said predetermined number of quantization levels number two and are symmetrically spaced from said reference level and adjacent thereto.

3. A system according to claim 1, wherein said means responsive includes a comparator circuit; and said means to transmit includes a source of reference level code pulses; and logic circuitry coupled to the output of said comparator, to said reference level code pulse source, and said coder.

4. A transmission system comprising:

a source of signal including varying voltage having an average value varying about a reference level and a noise voltage superimposed on said varying voltage;

a coder coupled to said source to sample said signal at given intervals, to quantize the amplitude of said signals, and to deliver a group of code pulses representing each quantized sample;

a decoder responsive to groups of code pulses to reproduce said varying voltage;

transmission means coupling the output of said coder to the input of said decoder including a noise suppressing means;

said noise suppressing means including:

means responsive to said groups of code pulses to recognize the groups of code pulses representing a predetermined number of quantization levels spaced from said reference level; and means coupled to said means responsive to transmit said groups of code pulses if they do not represent said predetermined number of quantization levels and a group of code pulses representing said reference level if said groups of code pulses do represent said predetermined number of quantization levels.

5. A transmission system comprising:

a source of signal including varying voltage having an average value varying about a reference level and a noise voltage superimposed on said varying voltage;

a coder coupled to said source to sample said signal at given intervals, to quantize the amplitude of said signals, and to deliver a group of code pulses representing each quantized sample;

a decoder responsive to groups of code pulses to reproduce said varying voltage;

noise suppressing means coupled to the output of said coder; and transmission means coupling the output of said suppressing means to the input of said decoder;

said noise suppressing means including:

means responsive to said groups of code pulses to recognize the groups of code pulses representing a predetermined number of quantization levels spaced from said reference level; and means coupled to said means responsive to transmit said groups of code pulses if they do not represent said predetermined number of quantization levels and a group of code pulses representing said reference level if said groups of code pulses do represent said predetermined number of quantization levels.

6. A transmission system comprising:

a source of signal including varying voltage having an average value varying about a reference level and a noise voltage superimposed on said varying voltage;

a coder coupled to said source to sample said signal at given intervals, to quantize the amplitude of said signals, and to deliver a group of code pulses representing each quantized sample;

a decoder responsive to groups of code pulses to reproduce said varying voltage;

a noise suppressing means coupled to the input of said decoder; and transmission means coupling the output of said coder to the input of said suppressing means;

said noise suppressing means including:

means responsive to said groups of code pulses to recognize the groups of code pulses representing a predetermined number of quantization levels spaced from said reference level; and means coupled to said means responsive to transmit said groups of code pulses if they do not represent said predetermined number of quantization levels and a group of code pulses representing said reference level if said groups of code pulses do represent said predetermined number of quantization levels.

7. A transmission system comprising:

a source of signal including a varying voltage having an average value varying about a reference level and a noise voltage superimposed on said varying voltage;

a coder coupled to said source to sample said signal at given intervals, to quantize the amplitude of said samples, and to deliver a group of code pulses representing each quantized sample;

a decoder responsive to groups of code pulses to reproduce said varying voltage; and a noise suppressing means coupled in a series relationship between said coder and said decoder including:

means responsive to said groups of code pulses to compare each group of code pulses with a preceding group of code pulses and delivering a first control signal when the compared groups of code pulses differ from each other by a given number of quantization levels;

means responsive to said groups of code pulses to recognize the groups of code pulses representing a predetermined number of quantization levels spaced from said reference level and deliver a second control signal in response to the recognition thereof; and means responsive to said first and second control signals to transmit without alteration said groups of code pulses in absence of coincidence of said first and second control signals and to substitute for said groups of code pulses the group of code pulses representing said reference level in response to coincidence of said first and second second control signals.

8. A system according to claim 7, wherein said predetermined number of quantization levels number two and are symmetrically spaced from said reference level and adjacent thereto.

9. A system according to claim 7, wherein said first control signal is delivered when said compared groups of code pulses represent adjacent quantization levels.

10. A system according to claim 7, wherein
said predetermined number of quantization levels number two and are symmetrically spaced from said reference level and adjacent thereto; and
said first control signal is delivered when the compared groups of code pulses represent adjacent quantization levels.

11. A system according to claim 7, wherein
said means to compare includes a first comparator circuit:
said means to recognize includes a second comparator circuit; and
said means responsive to said first and second control signals includes
a source of reference level code pulses; and
logic circuitry coupled to said first and second comparator circuits and said source of reference level code pulses.

12. In a transmission system transmitting signals in the form of a different group of code pulses representing each of a plurality of quantized samples of said signals, a means to suppress noise superimposed on said signals comprising:
means responsive to said groups of code pulses to recognize the groups of code pulses representing a predetermined number of quantization levels spaced from a reference level; and
means coupled to said means responsive to transmit said groups of code pulses if they do not represent said predetermined number of quantization levels and a group of code pulses representing said reference level if said groups of code pulses do represent said predetermined number of quantization levels.

13. A system according to claim 12, wherein said predetermined number of quantization levels number two disposed in a symmetrical relationship with respect to to said reference level and adjacent thereto.

14. A system according to claim 12, wherein
said means responsive includes a comparator circuit: and
said means to transmit includes a source of reference level code pulses; and
logic circuitry in coupled relation to said comparator circuit, said source of reference level code pulses and to the input of said groups of code pulses.

15. In a transmission system transmitting signals in the form of a different group of code pulses representing each of a plurality of quantized samples of said signals, a means to suppress noise superimposed on said signals comprising:
means responsive to said groups of code pulses to compare each group of code pulses with a preceding group of code pulses and deliver a first control signal when the compared groups of code pulses differ from each other by a given number of quantization levels;
means responsive to said group of code pulses to recognize the groups of code pulses representing a predetermined number of quantization levels spaced from a reference level and deliver a second control signal in response to the recognition thereof; and
means responsive to said first and second control signals to transmit without alteration said groups of code pulses in absence of coincidence of said first and second control signals and to substitute for said groups of code pulses the group of code pulses representing said reference lever in response to coincidence of said first and second control signals.

16. A system according to claim 15, wherein said prepredetermined number of quantization levels number two and are spaced symmetrically from said reference level and adjacent thereto.

17. A system according to claim 15, wherein said first control signal is delivered when the compared groups of code pulses represent adjacent quantization levels.

18. A system according to claim 15, wherein
said predetermined number of quantization levels number two and are spaced symmetrically from said reference level and adjacent thereto; and
said first control signal is delivered when the compared groups of code pulses represent adjacent quantization levels.

19. A system according to claim 15, wherein
said means to compare includes a comparator circuit;
said means to recognize includes a second comparator circuit; and
said means responsive to said first and second control signals includes
a source of reference level code pulses; and
logic circuitry in coupled relation to said first and second comparators, said source of reference level code pulses and the input for said groups of code pulses.

References Cited by the Examiner

UNITED STATES PATENTS

| | | | |
|---|---|---|---|
| 2,801,281 | 7/1957 | Oliver et al. | 325—42 |
| 3,026,375 | 3/1962 | Graham | 325—38 |
| 3,071,649 | 1/1963 | Goodall | 179—15 |

DAVID G. REDINBAUGH, *Primary Examiner.*